(12) United States Patent
Lazaridis et al.

(10) Patent No.: US 11,567,582 B2
(45) Date of Patent: Jan. 31, 2023

(54) METHOD FOR CONSERVING POWER ON A PORTABLE ELECTRONIC DEVICE AND A PORTABLE ELECTRONIC DEVICE CONFIGURED FOR THE SAME

(71) Applicant: BlackBerry Limited, Waterloo (CA)

(72) Inventors: Mihal Lazaridis, Waterloo (CA); Robert James Lowles, Waterloo (CA); Donald James Lindsay, Mountain View, CA (US); John Edward Dolson, Carp (CA); Danny Thomas Dodge, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/354,937

(22) Filed: Jun. 22, 2021

(65) Prior Publication Data

US 2021/0318758 A1    Oct. 14, 2021

Related U.S. Application Data

(63) Continuation of application No. 13/215,481, filed on Aug. 23, 2011, now abandoned.
(Continued)

(51) Int. Cl.
*G06F 3/01*    (2006.01)
*G06F 3/04883*    (2022.01)
(Continued)

(52) U.S. Cl.
CPC ............. *G06F 3/017* (2013.01); *G06F 1/3206* (2013.01); *G06F 1/3215* (2013.01); *G06F 3/04883* (2013.01)

(58) Field of Classification Search
CPC ...... G06F 3/017; G06F 1/3206; G06F 1/3215; G06F 3/04883
See application file for complete search history.

(56) References Cited

U.S. PATENT DOCUMENTS 7,469,381 B2 * 12/2008 Ording ................ G06F 3/04845
715/764
7,728,823 B2    6/2010 Lyon et al.
(Continued)

FOREIGN PATENT DOCUMENTS

| EP | 1818757 | 8/2007 |
| WO | 2008136551 | 11/2008 |
| WO | 2010058495 | 5/2010 |

OTHER PUBLICATIONS

Communication Pursuant to Article 94 (3) EPC issued in European Application No. 11178437.7 dated Jun. 16, 2017, 4 pages.
(Continued)

*Primary Examiner* — Benyam Ketema
(74) *Attorney, Agent, or Firm* — Fish & Richardson P.C.

(57) ABSTRACT

The present disclosure describes a method for conserving power on a portable electronic device and a portable electronic device configured for the same. In accordance with one embodiment, there is provided a method for conserving power comprising: switching a portable electronic device to a low power mode in response to a trigger condition; and switching the portable electronic device from the low power mode to a full power mode on the portable electronic device in response to detection of a designated wake-up gesture on a touch-sensitive overlay of the portable electronic device.

18 Claims, 6 Drawing Sheets

Related U.S. Application Data

(60) Provisional application No. 61/386,147, filed on Sep. 24, 2010.

(51) Int. Cl.
*G06F 1/3215* (2019.01)
*G06F 1/3206* (2019.01)

(56) References Cited

U.S. PATENT DOCUMENTS

| | | | | |
|---|---|---|---|---|
| 7,793,225 B2* | 9/2010 | Anzures | | G06F 21/629 |
| | | | | 345/173 |
| 8,122,384 B2* | 2/2012 | Partridge | | G06F 3/04883 |
| | | | | 715/863 |
| 8,209,637 B2* | 6/2012 | Chaudhri | | G06F 3/017 |
| | | | | 713/182 |
| 8,238,876 B2* | 8/2012 | Teng | | H04M 1/67 |
| | | | | 455/566 |
| 8,302,032 B2* | 10/2012 | Shin | | G06F 3/04883 |
| | | | | 715/788 |
| 8,464,146 B2* | 6/2013 | Kang | | H04N 1/00509 |
| | | | | 715/234 |
| 8,581,877 B2* | 11/2013 | Yoo | | G06F 1/1671 |
| | | | | 345/173 |
| 8,588,739 B2* | 11/2013 | Kawabata | | H04W 12/08 |
| | | | | 455/410 |
| 8,963,885 B2* | 2/2015 | Alameh | | G06F 3/03545 |
| | | | | 345/175 |
| 8,994,674 B2* | 3/2015 | Eguchi | | G06F 3/04883 |
| | | | | 345/173 |
| 9,041,663 B2* | 5/2015 | Westerman | | G06F 3/0418 |
| | | | | 345/173 |
| 9,086,799 B2* | 7/2015 | Johansson | | G06F 3/04883 |
| 9,310,994 B2* | 4/2016 | Hinckley | | G06F 3/0483 |
| 9,965,165 B2* | 5/2018 | Hinckley | | G06F 3/0488 |
| 10,268,367 B2* | 4/2019 | Hinckley | | G06F 3/04883 |
| 10,282,088 B2* | 5/2019 | Kim | | G06F 3/0486 |
| 10,592,080 B2* | 3/2020 | Vranjes | | G06F 3/04842 |
| 10,901,601 B2* | 1/2021 | Chaudhri | | G06F 9/451 |
| 11,157,143 B2* | 10/2021 | Yang | | G06F 3/0481 |
| 11,431,836 B2* | 8/2022 | Coffman | | G06F 1/1643 |
| 2003/0184523 A1 | 10/2003 | Badaye et al. | | |
| 2004/0212583 A1 | 10/2004 | Cobian | | |
| 2005/0012723 A1 | 1/2005 | Pallakoff | | |
| 2005/0198219 A1 | 9/2005 | Banetjee et al. | | |
| 2006/0075250 A1 | 4/2006 | Liao | | |
| 2006/0197750 A1* | 9/2006 | Kerr | | G06F 1/1647 |
| | | | | 345/173 |
| 2006/0238517 A1 | 10/2006 | King et al. | | |
| 2006/0250372 A1* | 11/2006 | Lii | | G06F 3/041661 |
| | | | | 345/173 |
| 2007/0002027 A1* | 1/2007 | Lii | | G06F 3/038 |
| | | | | 345/173 |
| 2007/0139372 A1* | 6/2007 | Swanburg | | G06F 3/0481 |
| | | | | 345/156 |
| 2007/0150842 A1* | 6/2007 | Chaudhri | | G06F 3/0484 |
| | | | | 715/863 |
| 2009/0146962 A1 | 6/2009 | Ahonen et al. | | |
| 2009/0167725 A1 | 7/2009 | Lee et al. | | |
| 2009/0174679 A1* | 7/2009 | Westerman | | G06F 3/04186 |
| | | | | 345/173 |
| 2009/0295753 A1 | 12/2009 | King et al. | | |
| 2010/0105443 A1* | 4/2010 | Vaisanen | | G06F 3/0486 |
| | | | | 345/173 |
| 2010/0155153 A1 | 6/2010 | Zachut | | |
| 2010/0245242 A1* | 9/2010 | Wu | | G06F 3/0488 |
| | | | | 345/157 |
| 2010/0302172 A1* | 12/2010 | Wilairat | | G06F 3/04883 |
| | | | | 345/173 |
| 2010/0309171 A1 | 12/2010 | Hsieh et al. | | |
| 2010/0313050 A1 | 12/2010 | Harrat et al. | | |
| 2010/0313125 A1 | 12/2010 | Fleizach et al. | | |
| 2011/0037712 A1 | 2/2011 | Kim et al. | | |
| 2011/0093816 A1* | 4/2011 | Chang | | G06F 3/0488 |
| | | | | 715/835 |
| 2011/0205163 A1* | 8/2011 | Hinckley | | G06F 3/0483 |
| | | | | 345/173 |
| 2011/0205183 A1 | 8/2011 | Sugihara | | |
| 2011/0209093 A1* | 8/2011 | Hinckley | | G06F 3/04883 |
| | | | | 715/834 |
| 2011/0209098 A1* | 8/2011 | Hinckley | | G06F 3/0483 |
| | | | | 715/863 |
| 2011/0209099 A1* | 8/2011 | Hinckley | | G06F 3/04883 |
| | | | | 715/863 |
| 2012/0023459 A1* | 1/2012 | Westerman | | G06F 3/04186 |
| | | | | 715/863 |
| 2012/0071149 A1 | 3/2012 | Bandyopadhyay et al. | | |
| 2012/0105345 A1* | 5/2012 | Lazaridis | | G06F 3/04166 |
| | | | | 345/173 |
| 2012/0154303 A1* | 6/2012 | Lazaridis | | G06F 1/3215 |
| | | | | 345/173 |
| 2012/0319971 A1* | 12/2012 | Eguchi | | G06F 3/04883 |
| | | | | 345/173 |
| 2014/0095994 A1* | 4/2014 | Kim | | G06F 3/016 |
| | | | | 715/702 |
| 2014/0351722 A1* | 11/2014 | Frederickson | | G06F 3/0481 |
| | | | | 715/761 |
| 2015/0160834 A1* | 6/2015 | Lee | | G06F 3/04842 |
| | | | | 715/810 |
| 2015/0220215 A1* | 8/2015 | Choi | | G06F 3/0481 |
| | | | | 715/800 |
| 2016/0283104 A1* | 9/2016 | Hinckley | | G06F 3/0482 |
| 2021/0096732 A1* | 4/2021 | Sonnino | | G06F 3/04842 |

OTHER PUBLICATIONS

Extended European Search Report issued in European Application No. 11178437.7 dated Feb. 6, 2012, 5 pages.

Extended European Search Report issued in European Application No. 18186597.3 dated Feb. 4, 2019, 6 pages.

Office Action issued in Canadian Application No. 2,750,352 dated Aug. 1, 2014, 2 pages.

Office Action issued in Canadian Application No. 2,750,352 dated Jan. 11, 2016, 4 pages.

Office Action issued in Canadian Application No. 2,750,352 dated Nov. 2, 2014, 4 pages.

Office Action issued in Canadian Application No. 2,750,352 dated Sep. 11, 2013, 3 pages.

Office Action issued in Canadian Application No. 2,750,352 dated Sep. 7, 2017, 4 pages.

Non-Final Office Action issued in U.S. Appl. No. 13/215,481 dated Oct. 22, 2015, 24 pages.

Final Office Action issued in U.S. Appl. No. 13/215,481 dated May 16, 2016, 32 pages.

Non-Final Office Action issued in U.S. Appl. No. 13/215,481 dated Sep. 8, 2016, 33 pages.

Final Office Action issued in U.S. Appl. No. 13/215,481 dated Jun. 12, 2017, 32 pages.

Non-Final Office Action issued in U.S. Appl. No. 13/215,481 dated Nov. 22, 2017, 30 pages.

Final Office Action issued in U.S. Appl. No. 13/215,481 dated Jul. 9, 2018, 33 pages.

* cited by examiner

METHOD FOR CONSERVING POWER ON A PORTABLE ELECTRONIC DEVICE AND A PORTABLE ELECTRONIC DEVICE CONFIGURED FOR THE SAME

RELATED APPLICATION DATA

This application is a continuation of and claims the benefit of priority to U.S. patent application Ser. No. 13/215,481, filed Aug. 23, 2011, which claims priority to U.S. Patent Application No. 61/386,147, filed Sep. 24, 2010, the contents of which are hereby incorporated by reference.

TECHNICAL FIELD

The present disclosure relates to electronic devices including, but not limited to, portable electronic devices having touch-sensitive displays, and more particularly to a method for conserving power on a portable electronic device and a portable electronic device configured for the same.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive display may be modified depending on the functions and operations being performed. Improvements in electronic devices with touch-sensitive displays are desirable.

DETAILED DESCRIPTION OF EXAMPLE EMBODIMENTS

Figure 1:
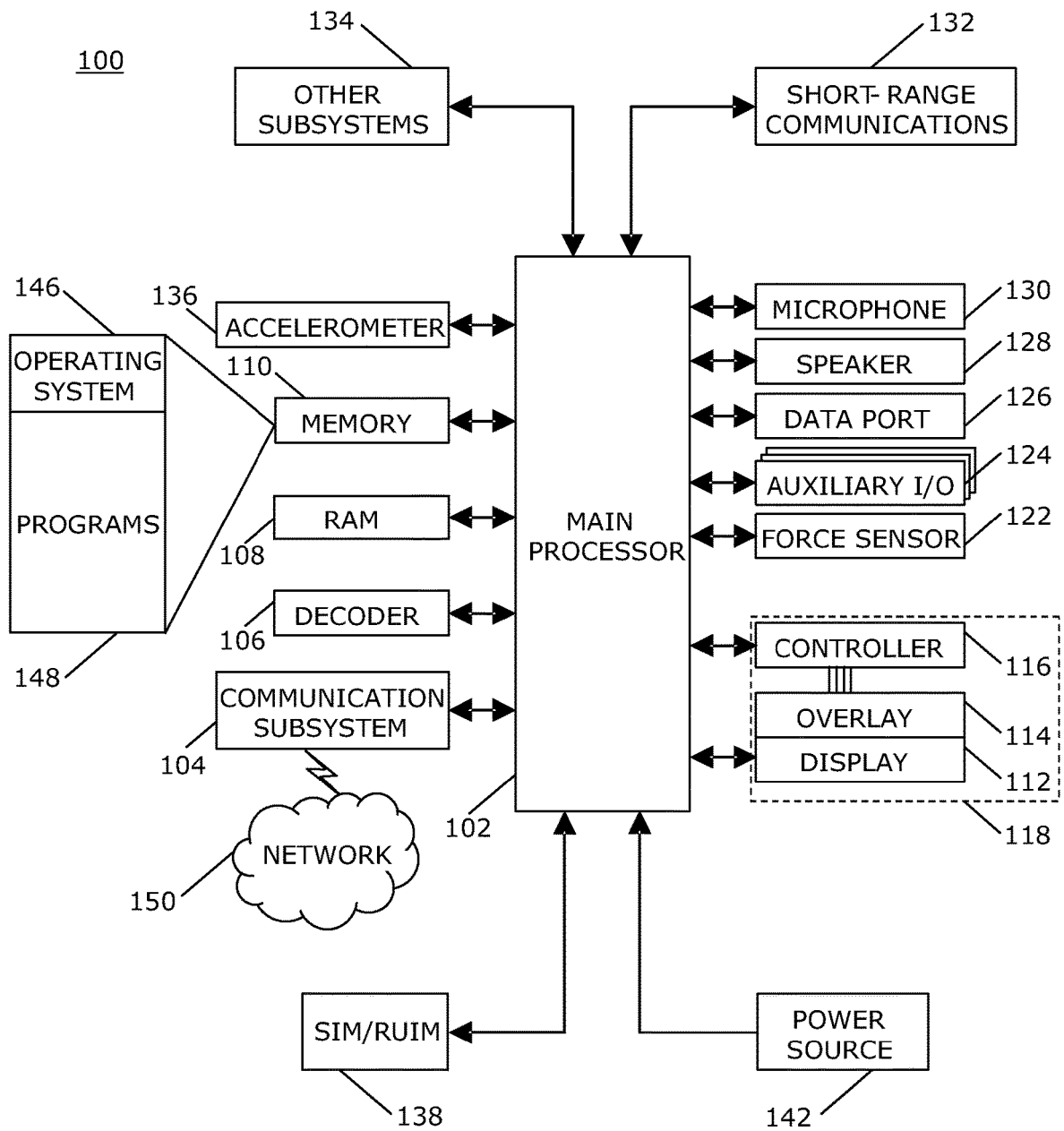
FIG. 1 is a block diagram of a portable electronic device in accordance with an example embodiment of the present disclosure.

The present disclosure describes an electronic device and a method that includes displaying information associated with a first application on a touch-sensitive display, detecting a touch on a touch-sensitive display and determining touch attributes, determining when the touch is a first gesture type based on the touch attributes, and when the touch is determined to be the first gesture type, forwarding information related to the touch to a second application, otherwise forwarding the information related to the touch to the first application. The present disclosure also describes a method of conserving power and a portable electronic device configured for the same.

In accordance with one embodiment, there is provided a method comprising: switching a portable electronic device to a low power mode in response to a trigger condition; and switching the portable electronic device from the low power mode to a full power mode on the portable electronic device in response to detection of a designated wake-up gesture on a touch-sensitive overlay of the portable electronic device. In some examples, the designated wake-up gesture is a meta-navigation gesture, wherein the meta-navigation gesture comprises a gesture with a start location outside of a display area of the touch-sensitive overlay and an end location within the display area of the touch-sensitive overlay.

In accordance with another embodiment, there is provided a method for conserving power on a portable electronic device, comprising: switching the portable electronic device to a low power mode in response to a trigger condition; detecting a touch on the touch-sensitive overlay; determining touch attributes of the touch; determining when the touch is the designated wake-up gesture based on the determined touch attributes; and switching the portable electronic device from the low power mode to a full power mode on the portable electronic device in response to detection of the designated wake-up gesture on the touch-sensitive overlay of the portable electronic device.

In some examples, the designated wake-up gesture is performed in a designated area of the touch-sensitive overlay. In some examples, the designated area is outside of a display area of the touch-sensitive overlay. The designated area may be a buffer region between a display area and a non-display area of the touch-sensitive overlay or a non-display area outside of a buffer region adjacent to a display area of the touch-sensitive overlay. In some examples, only the designated area of the touch-sensitive overlay is scanned to detect the designated wake-up gesture.

In some examples, the designated wake-up gesture is a meta-navigation gesture, wherein the meta-navigation gesture comprises a gesture with a start location outside of a display area of the touch-sensitive overlay and an end location within the display area of the touch-sensitive overlay. In some examples, the touch is determined to be a meta-navigation gesture when the start location of the touch is outside of a display area of the touch-sensitive display and the touch travels to the display area of the touch-sensitive display. In some examples, the touch is determined to be a meta-navigation gesture when the start location of the touch is outside of a display area of the touch-sensitive display and an outside of a buffer region adjacent the display area and the touch travels through the buffer region to the display area of the touch-sensitive display. In some examples, the touch is not a meta-navigation gesture when the start location is in the buffer region.

In accordance with a further embodiment, there is provided an electronic device comprising: a display, a touch-sensitive overlay which overlays a portion of the display; a processor coupled to the touch-sensitive overlay, wherein the processor is configured to perform the methods described herein. In some examples, the designated wake-up gesture is a meta-navigation gesture, wherein the meta-navigation gesture comprises a gesture with a start location outside of a display area of the touch-sensitive overlay and an end location within the display area of the touch-sensitive overlay.

In accordance with yet a further embodiment, there is provided an electronic device comprising: a display; a touch-sensitive overlay which overlays at least a portion of the display; a touch-sensitive bezel adjacent the touch-sensitive display; a processor coupled to the touch-sensitive overlay and touch-sensitive bezel, wherein the processor is configured to perform the methods described herein. In some examples, the designated wake-up gesture is a meta-navigation gesture which comprises a gesture with a start location on the touch-sensitive bezel. In some examples, the touch travels across the touch-sensitive bezel to a display area of the touch-sensitive display.

In accordance with yet a further embodiment, there is provided a computer-readable medium having computer-readable code stored thereon which is executable by at least one processor of a portable electronic device to perform the described method.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, such as a portable electronic device. Examples of portable electronic devices include wireless communication devices such as pagers, mobile or cellular telephones, smartphones, wireless organizers, PDAs, notebook computers, netbook computers, tablet computers, and so forth. The portable electronic device may also be a portable electronic device without wireless communication capabilities. Examples include handheld electronic game devices, digital photograph albums, digital cameras, notebook computers, netbook computers, tablet computers, and so forth.

A block diagram of an example of a portable electronic device 100 is shown in FIG. 1. The portable electronic device 100 includes multiple components, such as a processor 102 that controls the overall operation of the portable electronic device 100. The portable electronic device 100 presently described optionally includes a communication subsystem 104 and a short-range communications 132 module to perform various communication functions, including data and voice communications. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 to detect direction of gravitational forces or gravity-induced reaction forces so as to determine, for example, the orientation of the portable electronic device 100.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104, for example.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example embodiment, the touch-sensitive display 118 is a capacitive touch-sensitive display which includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 112 of the touch-sensitive display 118 includes a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact known as the centroid. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The location of the touch moves as the detected object moves during a touch. The controller 116 and/or the processor 102 may detect a touch by any suitable contact member on the touch-sensitive display 118. Similarly, multiple simultaneous touches, are detected.

The touch-sensitive overlay 114 is configured to detect one or more gestures. Alternatively, the processor 102 may be configured to detect one or more gestures in accordance with touch data provided by the touch-sensitive overlay 114. A gesture is a particular type of touch on a touch-sensitive display 118 that begins at an origin point and continues to an end point. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture.

An example of a gesture is a swipe (also known as a flick). A swipe has a single direction. The touch-sensitive overlay 114 may evaluate swipes with respect to the origin point at which contact is initially made with the touch-sensitive overlay 114 and the end point at which contact with the touch-sensitive overlay 114 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 114 to initialize the gesture, a horizontal movement of the detected object from the origin point to an end point towards the right or left side of the touch-sensitive overlay 114 while maintaining continuous contact with the touch-sensitive overlay 114, and a breaking of contact with the touch-sensitive overlay 114. Similarly, a vertical swipe typically comprises an origin point towards the top or bottom of the touch-sensitive overlay 114 to initialize the gesture, a horizontal movement of the detected object from the origin point to an end point towards the bottom or top of the touch-sensitive overlay 114 while maintaining continuous contact with the touch-sensitive overlay 114, and a breaking of contact with the touch-sensitive overlay 114.

Swipes can be of various lengths, can be initiated in various places on the touch-sensitive overlay 114, and need not span the full dimension of the touch-sensitive overlay 114. In addition, breaking contact of a swipe can be gradual in that contact with the touch-sensitive overlay 114 is gradually reduced while the swipe is still underway.

Meta-navigation gestures may also be detected by the touch-sensitive display 118. A meta-navigation gesture is a gesture that has an origin point that is outside the display area of the touch-sensitive display 118 and that moves to a position on the display area of the touch-sensitive display 118. In other words, a meta-navigation gesture comprises a gesture with a start location outside of a display area of the touch-sensitive overlay 114 and an end location within the display area of the touch-sensitive overlay 114. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive display 118. Thus, two fingers may be utilized for meta-navigation gestures. Further, multi-touch meta-navigation gestures may be distinguished from single touch meta-navigation gestures and may provide additional or further functionality.

In some example embodiments, an optional force sensor 122 or force sensors is disposed in any suitable location, for example, between the touch-sensitive display 118 and a back of the portable electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
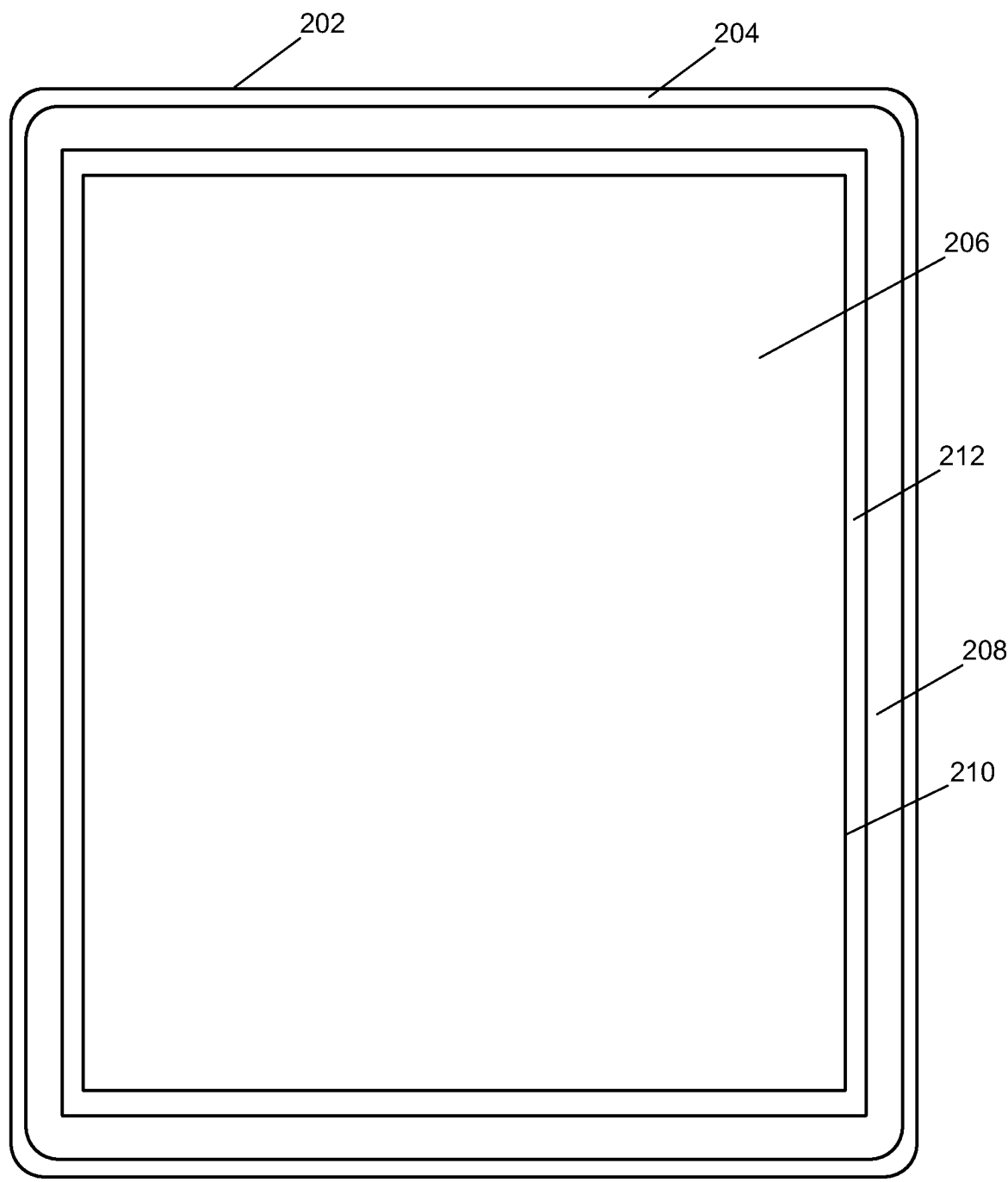
FIG. 2 is a front view of an example of a portable electronic device of the present disclosure.

FIG. 2 shows a front view of an example of the portable electronic device 100. The portable electronic device 100 includes a housing 202 that encloses components such as shown in FIG. 1. The housing 202 may include a back, sidewalls, and a front 204 that frames the touch-sensitive display 118. In the example of FIG. 2, the touch-sensitive display 118 is generally centered in the housing 202 such that a display area 206 of the touch-sensitive overlay 114 is generally centered with respect to the front 204 of the housing 202. A non-display area 208 of the touch-sensitive overlay 114 extends around the display area 206. In the presently described embodiment, the width of the non-display area is 4 mm.

For the purpose of the present example, the touch-sensitive overlay 114 extends to cover the display area and the non-display area of the display 112. Touches on the display area 206 may be detected and, for example, may be associated with displayed selectable features. Touches on the non-display area 208 may be detected, for example, to detect a meta-navigation gesture. Alternatively, meta-navigation gestures may be determined by both the non-display area 208 and the display area 206. The density of touch sensors may differ from the display area 206 to the non-display area 208. For example, the density of nodes in a mutual capacitive touch-sensitive display, or density of locations at which electrodes of one layer cross over electrodes of another layer, may differ between the display area 206 and the non-display area 208.

Gestures received on the touch-sensitive display 118 may be analyzed based on the attributes to discriminate between meta-navigation gestures and other touches, or non-meta navigation gestures. Meta-navigation gestures may be identified when the gesture crosses over a boundary near a periphery of the display 112, such as a boundary 210 between the display area 206 and the non-display area 208.

In the example of FIG. 2, the origin point of a meta-navigation gesture on the touch-sensitive display 118 may be determined utilizing the area of the touch-sensitive overlay 114 that covers the non-display area 208.

A buffer region 212 or band that extends around the boundary 210 between the display area 206 and the non-display area 208 may be utilized such that a meta-navigation gesture is identified when a touch has an origin point outside the boundary 210 and the buffer region 212 and crosses through the buffer region 212 and over the boundary 210 to a point inside the boundary 210 (i.e., in the display area 206). Thus, the buffer region 212 extends around the display area 206 and the non-display area 208 extends around the buffer region 212. Although illustrated in FIG. 2, the buffer region 212 may not be visible. Instead, the buffer region 212 may be a region around the boundary 210 that extends a width that is equivalent to a predetermined number of pixels, for example. Alternatively, the boundary 210 may extend a predetermined number of touch sensors or may extend a predetermined distance from the display area 206. The boundary 210 may be a touch-sensitive region or may be a region in which touches are not detected.

Gestures that have an origin point in the buffer region 212, for example, may be identified as non-meta navigation gestures. Optionally, data from such gestures may be utilized by an application as a non-meta navigation gesture. Alternatively, data from such gestures may be discarded such that touches that have an origin point on the buffer region 212 are not utilized as input at the portable electronic device 100.

Figure 3:
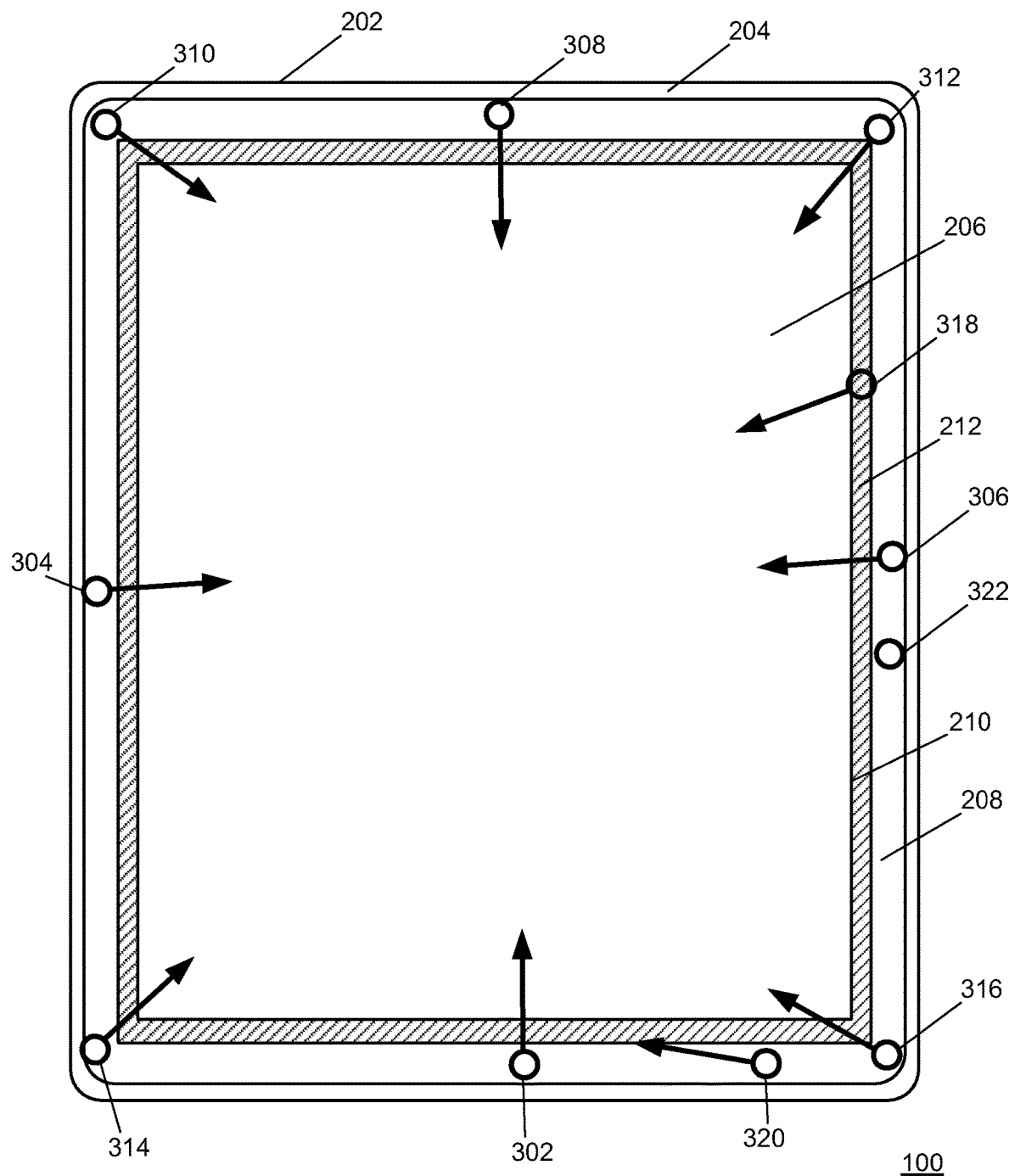
FIG. 3 illustrates examples of touches on the portable electronic device of FIG. 2.

FIG. 3 illustrates examples of touches on the touch-sensitive display 118. The buffer region 212 is illustrated in FIG. 3 by hash markings for the purpose of explanation. As indicated, the buffer region 212 may not be visible to the user. For the purpose of explanation, touches are illustrated by circles at their points of origin. Arrows extending from the circles illustrate the paths of the touches that are gestures.

The touch 302 begins at the origin point outside the boundary 210 and the outside of the buffer region 212. The path of the touch 302 crosses the buffer region 212 and the boundary 210 and is therefore identified as a meta-navigation gesture. Similarly, the touches 304, 306, 308, 310, 312, 314, 316 each have origin points outside the boundary 210 and the buffer region 212 and their paths cross the buffer region 212 and the boundary 210. Each of the touches 304, 306, 308, 310, 312, 314, 316 is therefore identified as a meta-navigation gesture. However, the touch 318 has an origin point that falls within the buffer region 212 and the touch 318 is therefore not identified as a meta-navigation gesture. The touch 320 begins at an origin point outside the boundary 210 and the buffer region 212. However, the path of the touch 320 does not cross the boundary 210 and is therefore not identified as a meta-navigation gesture. The touch 322 also has an origin point outside the boundary 210 and the buffer region 212 but is not a gesture and therefore does not cross the boundary 210 and is not identified as a meta-navigation gesture.

Figure 4:
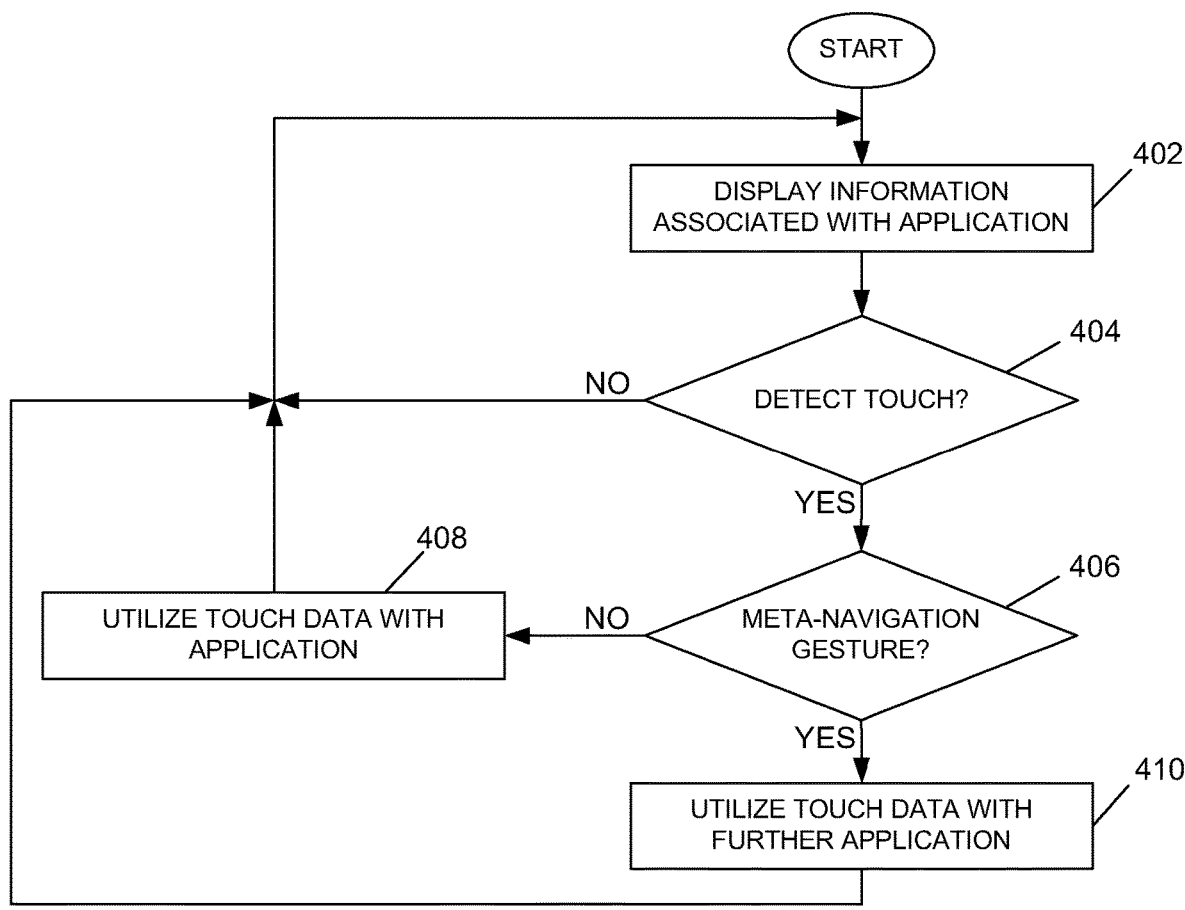
FIG. 4 is a flowchart illustrating a method of controlling the portable electronic device in accordance with one example embodiment of the present disclosure.

A flowchart illustrating a method of controlling an electronic device, such as the portable electronic device 100, is shown in FIG. 4. The method may be carried out by computer-readable code executed, for example, by the processor 102. Coding of software for carrying out such a method is within the scope of a person of ordinary skill in the art given the present description. The method may contain additional or fewer processes than shown and/or described, and may be performed in a different order.

The process may be carried out in any suitable application 148 including but not limited to a home screen application, an email messaging application, a text messaging application, a calendar application, a task application, an address book application, a Web browser application, or any other suitable application 148. Information from the application 148, referred to as the first application, is displayed on the touch-sensitive display 118 of the portable electronic device 100 at 402. When a touch is detected at 404, the process continues at 406 and a determination is made whether or not the touch is a meta-navigation gesture. The determination is made based on the attributes of the touch as described above. In response to determining that the touch is not a meta-navigation gesture, which may be a tap on the touch-sensitive display 118 or may be a non-meta navigation gesture, the touch data is utilized in association with the first application for which information is displayed on the touch-sensitive display 118 at the time the gesture is received, at 408. In response to identifying the touch as a meta-navigation gesture at 406, the touch data is utilized in a second application and information associated with the second, or with a further application, is displayed on the touch-sensitive display 118 at 410. The information associated with the second application may be overlaid on the information associated with the first application, for example, to facilitate navigation back to the information associated with the first application. Alternatively, the information associated with the second application may include, for example, information from a system level navigation interface, a configuration interface, a notification interface, a status interface, a menu interface, or information associated with any other interface.

Figure 5:
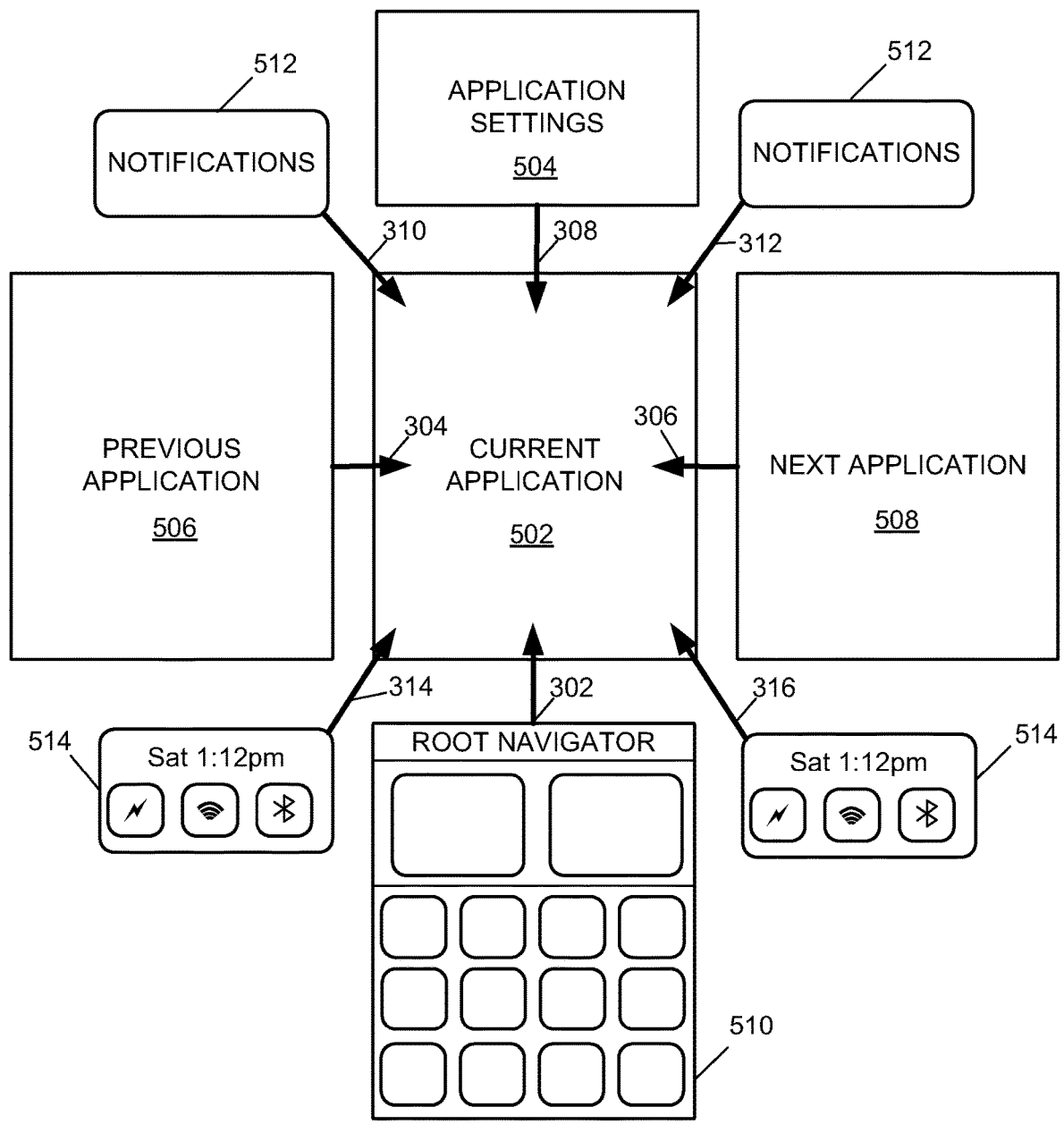
FIG. 5 illustrates examples of associations between meta-navigation gestures and information from applications in accordance with one example embodiment of the present disclosure.

Referring again to FIG. 3, the touches 302, 304, 306, 308, 310, 312, 314, 316 identified as meta-navigation gestures may each be associated with information from an application such that attributes of the meta-navigation gesture such as the origin point, may be utilized to determine which application the meta-navigation gesture is associated with. FIG. 5 illustrates examples of associations between meta-navigation gestures and information from applications 148, other than the application associated with the information displayed on the touch-sensitive display 118 at the time the gesture is received. The relationships shown in FIG. 5 are shown for illustrative purposes only and are interchangeable. Further relationships may also be utilized illustrated for the purpose of explanation. Further applications 148 and alternative associations may be utilized. The terms top, bottom, right, and left are utilized herein for the purpose of providing a reference and refer to an area of the portable electronic device 100 relative to the orientation in which the information associated with the application is displayed.

The meta-navigation gesture 302, which originates near a bottom, center of the touch-sensitive display 118 and follows a generally vertical path in the orientation in which the information from a current application 502 is displayed, causes a home screen associated with a root-navigation application 510 to replace the information associated with the current application 502. The home screen includes a carousel showing the currently active applications indicated in a top portion of the display. Accordingly, currently active apps are shown in a browsable carousel in the top portion of the home screen. The carousel is located at a top portion of the home screen. In the described embodiment, the top portion utilizes only about ⅓ of the home screen and application icons for non-active applications are provided at the bottom portion of the home screen for ease of selection.

The meta-navigation gesture 304, which originates near a left, center of the touch-sensitive display 118 and follows a generally lateral path, causes the information associated with the current application 502 to be replaced with information associated with a previous application 506, which may be a previous application in a grouping or may be an application associated with information previously displayed. The meta-navigation gesture 306, which originates near a right, center of the touch-sensitive display 118 and follows a generally lateral path, causes the information associated with the current application 502 to be replaced with information associated with a next application 508, which may be a next application in a grouping.

The lateral gesture from either the left side or the right side of the touch-sensitive display 118 may cause the information associated with the current application 502 to be reduced in size to provide a visual cue of other active applications 148 prior to replacing the information with the previous application 506 or the next application 508. For example, a portion of the information of the previous application 506 or a portion of the information for the next application 508 may be displayed in a thin sliver adjacent the edges of the display area 206. In this example, a swipe within the thin sliver may cause scrolling of the next and last applications in a list.

The meta-navigation gesture 308, which originates near a top, center of the touch-sensitive display 118 and follows a generally vertical path, causes the information associated with the current application 502 to be replaced with information associated with an applications settings application 504.

The meta-navigation gesture 310, which originates near a top, left corner of the touch-sensitive display 118, causes information associated with a notification application 512 to be tiled over the information associated with the current application 502. Similarly, the meta-navigation gesture 312, which originates near a top, right corner of the touch-sensitive display 118, causes information associated with the notification application 512 to be tiled over the information associated with the current application 502.

The meta-navigation gesture 314, which originates near a bottom, left corner of the touch-sensitive display 118, causes information associated with a status application 514 to be tiled over the information associated with the current application 502. Similarly, the meta-navigation gesture 316, which originates near a bottom, right corner of the touch-sensitive display 118, causes information associated with the status application 514 to be tiled over the information associated with the current application 502.

The present disclosure is not limited to identifying meta-navigation gestures utilizing a touch-sensitive overlay 114 that extends over a non-display area. Meta-navigation gestures may be detected based on, for example, the first detected touch location at a margin of the touch-sensitive overlay 114, which may be at a margin of the displayable area, and, optionally, based on the gesture speed or direction when the touch is detected or path traversed by the gesture. Identification of meta-navigation gestures may also be carried out utilizing a heuristic algorithm based on touch attributes and responsive to touch attributes such as one or more of the origin point, speed, direction, distance and path of the gesture.

Optionally, the electronic device may include a touch-sensitive frame of the housing or a touch-sensitive bezel circumscribing the touch-sensitive overlay. Meta-navigation gestures may be identified based on an origin point detected on the touch-sensitive frame or bezel.

Further, the boundary that is crossed by a meta-navigation gesture is not limited to the boundary between the display area and the non-display area of the touch-sensitive display 118. Other suitable boundaries may be utilized and may include a region or band along a margin of the touch-sensitive overlay 114, a predetermined line, or lines on the touch-sensitive display 118, or the boundary where the bezel or frame of the electronic device meets the touch-sensitive display 118.

Thus, identification of meta-navigation gestures is not limited to electronic devices with touch-sensitive displays that include a touch-sensitive overlay 114 that covers the non-display area of the display 112. The identification of meta-navigation gestures may be carried out utilizing other electronic devices.

The use of meta-navigation gestures and the identification of such gestures provide additional input that may be distinguished from non-meta navigation gestures or other touches. These meta-navigation gestures facilitate entry of input related to an application 148 for which information is not displayed at the time the gesture is received. Thus, input may be received relating to an application that is not associated with information displayed on the touch-sensitive display 118 without the use of icons or selectable features displayed on the touch-sensitive display 118. An area or areas of the touch-sensitive display 118 are not taken up to display such icons or selectable features. System level navigation is therefore provided without the use of additional screens or menus for such navigation, providing an improved interface.

Figure 6:
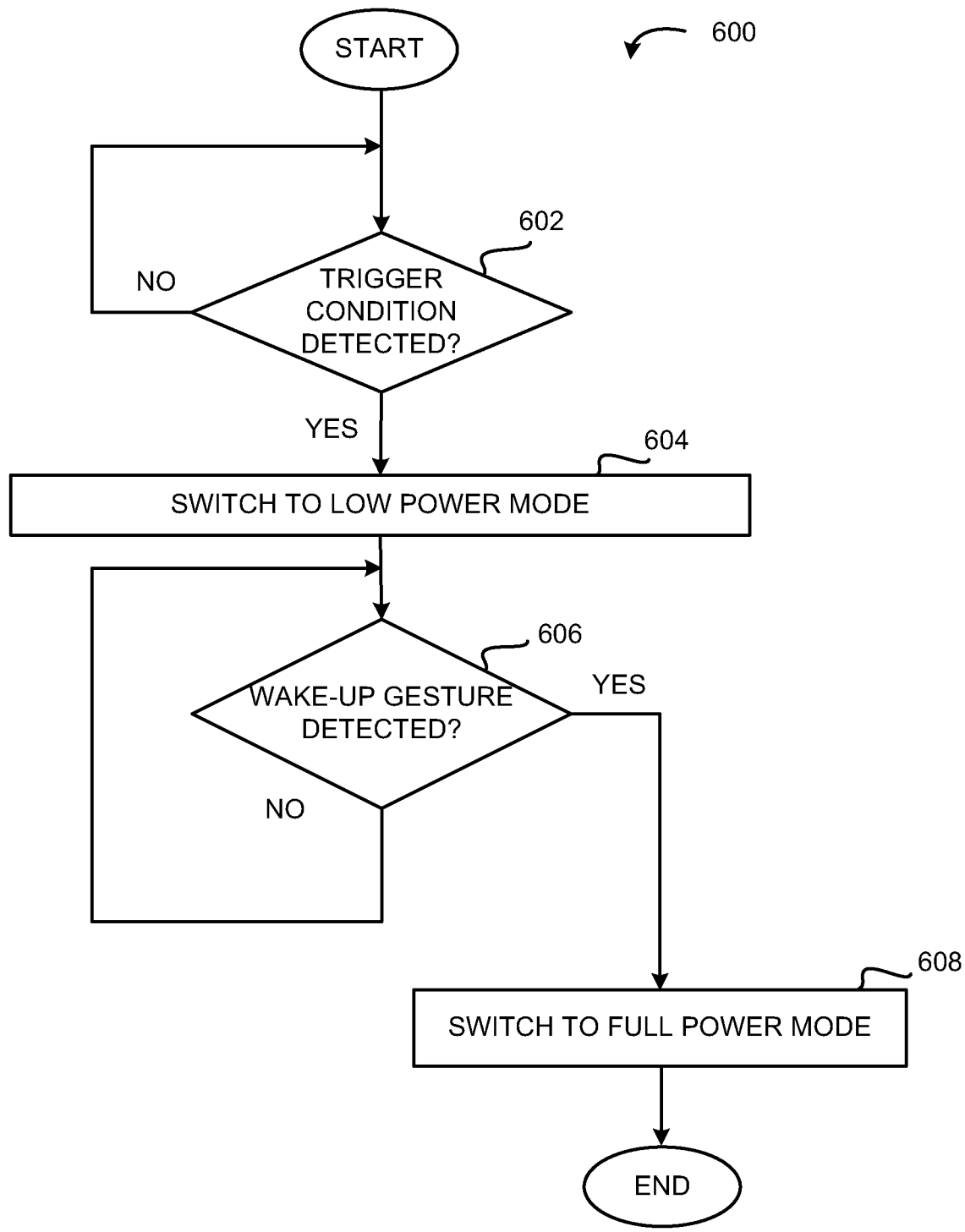
FIG. 6 is a flowchart illustrating a method of conserving power on the portable electronic device in accordance with one example embodiment of the present disclosure.

A flowchart illustrating a method of conserving power on an electronic device, such as the portable electronic device 100, is shown in FIG. 6. The method may be carried out by computer-readable code executed, for example, by the processor 102. Coding of software for carrying out such a method is within the scope of a person of ordinary skill in the art given the present description. The method may contain additional or fewer processes than shown and/or described, and may be performed in a different order. The process may be carried out by a power saving process which operates in the background as part of the operating system 146.

The processor 102 monitors for one or more predetermined trigger conditions for entering a low power mode at 602. The portable electronic device 100 has several power modes: a full power mode (also referred to as a normal power or "on" mode) in which full or "normal" functionality of the portable electronic device 100 is provided; a low power mode (sometimes also referred to as a "sleep" or "standby" mode) in which reduced functionality of the portable electronic device 100 is provided to conserve power; and an "off" mode in which the portable electronic device 100 is powered-off and performs no functions or a minimized set of functions.

The trigger conditions may include but are not limited to one or any combination of selection of a corresponding option via corresponding input, inactivity of the input devices (e.g., touch-sensitive overlay 114) for a threshold duration, inactivity of the communication subsystem 104 for a threshold duration, a lack of wireless network coverage for a threshold duration, or other suitable trigger condition(s).

When a trigger condition for entering the low power mode is detected, the processor 102 causes the portable electronic device 100 to switch to the low power mode from the full power mode at 604. The portable electronic device 100 monitors for and detects a designated wake-up gesture on the touch-sensitive overlay 114 at 606. In some example embodiments, in the low power mode the portable electronic device 100 monitors for a wake-up interrupt from the touch-sensitive overlay 114. The wake-up interrupt is a signal transmitted from the touch-sensitive overlay 114 to an interrupt port on the processor 102 of the portable electronic device 100. In the shown example, the processor 102 monitors for and detects interrupts from the touch-sensitive overlay 114. The touch-sensitive overlay 114 monitors for and detects a designated wake-up gesture. The wake-up gesture is a gesture designated to cause the portable electronic device 100 to exit or "terminate" the low power mode.

In at least some examples, monitoring for and detecting a designated wake-up gesture on the touch-sensitive overlay 114 comprises detecting a touch on the touch-sensitive overlay 114. The touch attributes of the touch are then determined. The processor 102 then determines whether the touch is the designated wake-up gesture based on the determined touch attributes. When the determined touch attributes match touch attributes of the designated wake-up gesture, the designated wake-up gesture has been detected.

In other embodiments, rather than monitoring for and detecting a wake-up interrupt from the touch-sensitive overlay 114, touch data may be passed from the touch-sensitive overlay 114 to the processor 102 which detects the designated wake-up gesture. In such embodiments, the touch-sensitive overlay 114 can be put in a low reporting mode when the portable electronic device 100 is in the low power mode. In the low reporting mode, the touch-sensitive overlay 114 only sends touch data to the processor 102 when a threshold change in state of the is detected. The low reporting mode can be contrasted with a full reporting mode in which the touch-sensitive overlay 114 sends touch data to the processor 102 at regular scanning cycles irrespective of its state. For example, a change in the location of a touch event greater than a predetermined threshold or a change in the number of touches can cause a change of state of the touch-sensitive overlay 114.

The portable electronic device 100 may also enter or initiate a locked mode in response to detecting a trigger condition at 602. In some embodiments, the trigger conditions to enter the locked mode are the same as the trigger conditions to enter the low power mode. Alternatively, entering the low power mode may be a trigger condition to enter the locked mode. In the locked mode, the processor 102 enforces restrictions limiting interaction with the portable electronic device 100. The restrictions typically affect at least some of its input interfaces/devices (e.g., touch-sensitive overlay 114, auxiliary I/O 124, accelerometer 136) and at least some of its output interfaces/devices (e.g., display screen 112, speaker 128).

When the portable electronic device 100 is in the low power mode, all or substantially all of the other functions normally performed by the processor 102 in the full power mode, including but not limited to receiving inputs other than an interrupt from the touch-sensitive overlay 114, are disabled. Accordingly, inputs from device subsystems other than the interrupt port of the processor 102 coupled to the touch-sensitive overlay 114 are not monitored nor detected in the low power mode.

In some example embodiments, the processor 102 also switches from a system clock (not shown) to a sleep clock (not shown) in the low power mode. In such embodiments, the portable electronic device 100 may include one or more clocks including the system clock and sleep clock. Alternatively, the portable electronic device 100 may include a single clock which can operate as both the system clock and the sleep clock. The sleep clock is a lower power, lower frequency clock. By way of example, the system clock may comprise a voltage controlled oscillator operating at a frequency of approximately 700 to 800 megahertz (though the speed of the system clock may vary depending on the mode of the portable electronic device 100), whereas the sleep clock may comprise a low power oscillator operating at a frequency in the range of 30 kilohertz to 60 kilohertz. In one example embodiment, the sleep clock operates at 32 kilohertz to reduce the power consumption compared with the system clock which operates at 700 to 800 megahertz.

The display 112 is also deactivated when the portable electronic device 100 is in the low power mode. When the display 112 is deactivated, its backlight is deactivated. Typically, the display 112 is not powered in the low power mode. The touch-sensitive overlay 114, or a part thereof, continues to monitor for touch inputs and detect the designated wake-up gesture in the low power mode. Other touch inputs, such as other gestures, are not detected and are ignored when performed by a user when the portable electronic device 100 is in the low power mode.

In some example embodiments, in the low power mode the touch-sensitive overlay 114 scans for touch events and detects touch data at a lower rate than when in the full power mode to conserve the power of the power source 142 (e.g., battery). Because fewer gestures and other touch events need to be detected in the low power mode, a lower scanning rate may be used without significantly affecting its ability to detect the designated wake-up gesture. This can be contrasted with the full power mode during normal operation of the portable electronic device 100 when scanning should be performed at a higher rate to keep up with user interaction with the touch-sensitive overlay 114. In such embodiments, the designated wake-up gesture should be selected so as to be readily determined using the lower scanning rate while reducing or avoiding erroneous detections of the designated wake-up gesture.

To debounce accidental touches by the user or other objects on the touch-sensitive overlay 114, the designated wake-up gesture may have a threshold distance, velocity, or length. In example embodiments, the length of a gesture is determined as a straight line from the origin point and the end point of the gesture. Alternatively, the length of the gesture is determined as a travel distance of the location of the touch event (e.g., centroid of the touch event) over the duration of the gesture. The length may be measured in displayed pixels or screen distance (e.g., the physical distance travelled by the detected objected). An example threshold length is 30 millimeters (mm) in screen distance. The screen distance may be determined from the origin point and the end point of the gesture, typically measured in terms of pixels, using a ratio of the screen resolution (which, for example, may be given in pixels) to screen size (which, for example, may be given in millimeters).

In some example embodiments, the designated wake-up gesture is a swipe in a designated direction relative to a top of the portable electronic device 100 (or more particularly the touch-sensitive overlay 114) or other reference position on the portable electronic device 100 (or more particularly the touch-sensitive overlay 114). The reference position may be relative to a screen orientation of the GUI or other information displayed on the display 112, such as the top of the GUI. The screen orientation may change depending on the orientation of the portable electronic device 100, which may be detected with the accelerometer 136 or based on acceleration data provided by the accelerometer 136 or other orientation sensor. Thus, the designated wake-up gesture may be a swipe in a designated direction relative to a top of the GUI or other information displayed on the display 112.

The designated wake-up gesture may be an edge-to-edge swipe between a first edge of the boundary 210 and a second edge of the boundary 210 opposite to the first edge such as, for example, a left-right swipe between the left and right edge of the boundary 210, right-left swipe between the right and left edge of the boundary 210, up-down swipe between the top and bottom edge of the boundary 210, or down-up swipe between the bottom and top edge of the boundary 210.

In other example embodiments, the designated wake-up gesture may be a pair of swipes on opposite sides of the touch-sensitive overlay 114 each in a designated direction relative to a top of the portable electronic device 100 (or more particularly the touch-sensitive overlay 114) or other reference position on the portable electronic device 100 (or more particularly the touch-sensitive overlay 114). Thus, the designated wake-up gesture may be a pair of swipes on opposite sides of the touch-sensitive overlay 114 each in a designated direction relative to a top of the GUI or other information displayed on the display 112.

The swipes in the pair of swipes are performed concurrently or substantially concurrently with each other. For example, the designated wake-up gesture may be a pair of down swipes located towards the left and right sides of the touch-sensitive overlay 114 which are detected concurrently or substantially concurrently with each other, or a pair of up swipes located towards the left and right sides of the touch-sensitive overlay 114 which are detected concurrently or substantially concurrently with each other. These configurations allow the designated wake-up gesture to be performed relatively easily by a user while holding the portable electronic device 100 with two hands such as, for example, when the portable electronic device 100 is a tablet computer or other tablet-style electronic device. A table-style device is typically held with two-hands, with each hand grasping one of the sides of the device. While being held in this way, the user can easily perform a pair of down or up swipes with his or her thumbs in the area of about the left and right sides of the touch-sensitive overlay 114.

The designated wake-up gesture may be limited to a designated area. In some example embodiments, the designated wake-up gesture is a gesture performed entirely in the display area 206 of the touch-sensitive overlay 114. Alternatively, in other example embodiments, the designated wake-up gesture is a gesture performed entirely in the non-display area 208 of the touch-sensitive overlay 114. Alternatively, in yet other example embodiments, the designated wake-up gesture is a gesture performed entirely in the buffer region 212 of the touch-sensitive overlay 114 between the display area 206 and non-display area 208, or the area outside of the display area 206 defined by both the non-display area 208 and buffer region 212. The described locations limit the area in which the designated wake-up gesture may be performed, reducing the possibility that erroneous or accidental touch input may be detected as the designated wake-up gesture. This aims to reduce the number of accidental wake-ups, providing further power conservation while reducing wear on the touch-sensitive overlay 114.

The use of the non-display area 208 of the touch-sensitive overlay 114, the buffer region 212 of the touch-sensitive overlay 114 between the display area 206 and non-display area 208, or entire the area outside of the display area 206 defined by the non-display area 208 and buffer region 212 as the designated area allow the designated wake-up gesture to be performed relatively easily by a user while holding the portable electronic device 100 with two hands such as, for example, when the portable electronic device 100 is a tablet computer or other tablet-style electronic device. A table-style device is typically held with two-hands, with each hand grasping one of the sides of the device. While being held in this way, the user can easily perform a pair of down or up swipes with his or her thumbs in the area of about the left and right sides of the touch-sensitive overlay 114.

When the designated wake-up gesture is limited to a designated area of the touch-sensitive overlay 114, as in the embodiments described above, only the designated area of the touch-sensitive overlay 114 is relevant to monitoring and detecting the designated wake-up gesture. Depending on design factors such as the scanning orientation and technique utilized by the touch-sensitive overlay 114, the low power mode may further comprise scanning only the area of the touch-sensitive overlay 114 in which the designated wake-up gesture may be performed, such as the non-display area 208 and/or buffer region 212, or display area 206. In some embodiments, the display area 206, non-display area 208 and buffer region 212 may each be separately driven, for example, and only the relevant area in which the designated wake-up gesture may be performed is scanned in the low power mode of the portable electronic device 100. This may require that the touch-sensitive overlay 114 be comprised of separate sensor elements.

In yet other example embodiments, the designated wake-up gesture may be a meta-navigation gesture such as a swipe having an origin point that is outside the display area 206 of the touch-sensitive overlay 114 and that moves to a position on the display area 206 of the touch-sensitive overlay 114. In other words, the meta-navigation gesture comprises a gesture with a start location outside of a display area 206 of the touch-sensitive overlay 118 and an end location within the display area 206 of the touch-sensitive overlay 118. The origin point may be in the non-display area 208, the buffer region 212, or either the non-display area 208 or the buffer region 212, depending on the embodiment. The meta-navigation gesture of the designated wake-up gesture may be a swipe in any direction, or a swipe in a designated direction relative to a top of the portable electronic device 100 (or more particularly the touch-sensitive overlay 114) or other reference position on the portable electronic device 100 (or more particularly the touch-sensitive overlay 114).

When the designated wake-up gesture is a meta-navigation gesture, in at least some examples the determined touch attributes comprise a start location of the touch and one or more of a distance travelled of the touch, a speed of the touch when the touch is detected, a direction of the touch when the touch is detected or an end location of the touch. A touch is determined to be a meta-navigation gesture based on the start location and the one or more of the speed when the touch is detected, the direction of the touch when the touch is detected or the end location of the touch. In some examples, the touch is determined to be a meta-navigation gesture when the start location of the touch is outside of a display area of the touch-sensitive display and the touch travels to the display area of the touch-sensitive display. In some examples, the touch is determined to be a meta-navigation gesture when the start location of the touch is outside of a display area of the touch-sensitive display and an outside of a buffer region adjacent the display area and the touch travels through the buffer region to the display area of the touch-sensitive display. In some examples, the touch is not a meta-navigation gesture when the start location is in the buffer region.

In some examples, when the designated wake-up gesture is a meta-navigation gesture, detecting a touch comprises detecting multiple touches that overlap in time on the touch-sensitive display and determining touch attributes for each touch, wherein determining when the touch is the designated wake-up gesture comprises determining that the multiple touches comprise a meta-navigation gesture when at least one of the touches is a meta-navigation gesture.

In some examples, the designated wake-up gesture is a meta-navigation gesture which comprises a gesture with a start location on a touch-sensitive bezel of the portable electronic device 100. In some examples, the touch travels across the touch-sensitive bezel to the display area 206 of the touch-sensitive display 118. Alternatively, the touch travels across the touch-sensitive bezel to the buffer region 212 between the display area 206 and the non-display area 208 of the touch-sensitive overlay 118. Alternatively, the touch travels across the touch-sensitive bezel to a non-display area 208 outside of the buffer region 212 adjacent to the display area 206 of the touch-sensitive overlay 218.

The use of a designated wake-up gesture limits the gestures which can switch from the low power mode to the full power mode area to a single, distinct gesture, reducing the possibility that erroneous or accidental touch input may be detected as the designated wake-up gesture. This aims to reduce the number of accidental wake-ups, providing further power conservation while reducing wear on the touch-sensitive overlay 114. The use of a pair of swipes on opposite sides of the touch-sensitive overlay 114 or a meta-navigation gesture further reduces the possibility that erroneous or accidental touch input may be detected as the designated wake-up gesture as such gestures are more unlikely to be performed accidentally.

When the designated wake-up gesture is detected by the touch-sensitive overlay 114 at 606, the processor 102 causes the portable electronic device 100 to switch from the low power mode to the full power mode at 608 (e.g., to wake-up from or exit the low power mode). When exiting or leaving the low power mode, the changes made to the operation of the portable electronic device 100 are reversed or undone.

Initiating the full power mode comprises enabling the functions normally performed by the processor 102 in the full power mode which were disabled in the low power mode, including but not limited to receiving inputs other than an interrupt from the touch-sensitive overlay 114. Initiating the full power mode may also comprise the processor 102 switching from the sleep clock to the system clock, reactivating the display 112, and increase the scanning rate of the touch-sensitive overlay 114 from the lower rate of the low power mode to the higher rate of the full power mode.

The present disclosure provides a method of conserving power on a portable electronic device 100 and a portable electronic device 100 configured for same which uses a designated wake-up gesture to cause a wake-up from a low power mode. Other touch events are ignored by the portable electronic device 100. This avoids the need for a dedicated key, button or switch to wake the portable electronic device.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

The invention claimed is:

1. A method, comprising:
displaying, on a screen of an electronic device, information associated with a current application;
detecting a touch gesture; and
displaying information associated with a second application on the screen based on a direction of the touch gesture, wherein the touch gesture proceeds along a first direction, and the information associated with the current application on the screen is replaced with information associated with a plurality of currently active applications and application icons for currently inactive applications in response to the touch gesture proceeding along the first direction.

2. The method of claim 1, further comprising:
determining that the touch gesture begins at an origin point outside a boundary, and that the touch gesture proceeds to cross the boundary, wherein the boundary separates a display area and a non-display area of the electronic device, and wherein the information associated with the second application is displayed in response to the determination that the touch gesture begins at the at the origin point outside the boundary and that the touch gesture proceeds to cross the boundary.

3. The method of claim 1, wherein the information associated with the plurality of currently active applications and application icons for currently inactive applications is displayed in a home screen associated with a root-navigation application.

4. The method of claim 1, wherein the information associated with the plurality of currently active applications is displayed in a carousel in a top portion of the screen.

5. The method of claim 1, further comprising:
detecting a second touch gesture; and wherein the second touch gesture proceeds along a second direction, and the information associated with the current application on the screen is replaced with information associated with a different application, wherein the different application is one of a previous application in a grouping of applications, an application associated with information previously displayed, or a next application in the grouping of applications.

6. The method of claim 1, further comprising:
detecting a third touch gesture; and wherein the third touch gesture proceeds along a third direction, and the information associated with the current application on the screen is replaced with information associated with application settings.

7. The method of claim 1, further comprising:
detecting a fourth touch gesture; and wherein the fourth touch gesture proceeds along a fourth direction, and the information associated with the current application on the screen is replaced with information associated with a notification application.

8. The method of claim 1, further comprising:
detecting a fifth touch gesture; and wherein the fifth touch gesture proceeds along a fifth direction, and the information associated with the current application on the screen is replaced with information associated with a status application.

9. An electronic device, comprising:
at least one processor;
one or more non-transitory computer-readable storage media coupled to the at least one processor and storing programming instructions for execution by the at least one processor, wherein the programming instructions, when executed, cause the electronic device to perform operations comprising:
displaying, on a screen of the electronic device, information associated with a current application;
detecting a touch gesture; and
displaying information associated with a second application on the screen based on a direction of the touch gesture, wherein the touch gesture proceeds along a first direction, and the information associated with the current application on the screen is replaced with information associated with a plurality of currently active applications and application icons for currently inactive applications in response to the touch gesture proceeding along the first direction.

10. The electronic device of claim 9, the operations further comprising:
determining that the touch gesture begins at an origin point outside a boundary, and that the touch gesture proceeds to cross the boundary, wherein the boundary separates a display area and a non-display area of the electronic device, and wherein the information associated with the second application is displayed in response to the determination that the touch gesture begins at the at the origin point outside the boundary and that the touch gesture proceeds to cross the boundary.

11. The electronic device of claim 9, wherein the information associated with the plurality of currently active applications and application icons for currently inactive applications is displayed in a home screen associated with a root-navigation application.

12. The electronic device of claim 9, wherein the information associated with the plurality of currently active applications is displayed in a carousel in a top portion of the screen.

13. The electronic device of claim 9, wherein the operations further comprise: detecting a second touch gesture; and wherein the second touch gesture proceeds along a second direction, and the information associated with the current application on the screen is replaced with information associated with a different application, wherein the different application is one of a previous application in a grouping of applications, an application associated with information previously displayed, or a next application in the grouping of applications.

14. The electronic device of claim 9, wherein the operations further comprise: detecting a third touch gesture; and wherein the third touch gesture proceeds along a third direction, and the information associated with the current application on the screen is replaced with information associated with application settings.

15. The electronic device of claim 9, wherein the operations further comprise: detecting a fourth touch gesture; and wherein the fourth touch gesture proceeds along a fourth direction, and the information associated with the current application on the screen is replaced with information associated with a notification application.

16. The electronic device of claim 9, wherein the operations further comprise: detecting a fifth touch gesture; and wherein the fifth touch gesture proceeds along a fifth direction, and the information associated with the current application on the screen is replaced with information associated with a status application.

17. One or more non-transitory computer-readable media containing instructions which, when executed, cause an electronic device to perform operations comprising:
displaying, on a screen of the electronic device, information associated with a current application;
detecting a touch gesture; and
displaying information associated with a second application on the screen based on a direction of the touch gesture, wherein the touch gesture proceeds along a first direction, and the information associated with the current application on the screen is replaced with information associated with a plurality of currently active applications and application icons for currently inactive applications in response to the touch gesture proceeding along the first direction.

18. The one or more non-transitory computer-readable media of claim 17, the operations further comprising:
determining that the touch gesture begins at an origin point outside a boundary, and that the touch gesture proceeds to cross the boundary, wherein the boundary separates a display area and a non-display area of the electronic device, and wherein the information associated with the second application is displayed in response to the determination that the touch gesture begins at the at the origin point outside the boundary and that the touch gesture proceeds to cross the boundary.

* * * * *

UNITED STATES PATENT AND TRADEMARK OFFICE
CERTIFICATE OF CORRECTION

| | |
|---|---|
| PATENT NO. | : 11,567,582 B2 |
| APPLICATION NO. | : 17/354937 |
| DATED | : January 31, 2023 |
| INVENTOR(S) | : Mihal Lazaridis et al. |

It is certified that error appears in the above-identified patent and that said Letters Patent is hereby corrected as shown below:

In the Claims

In Column 16, Line 24, In Claim 2, delete "at the at the" and Insert -- at the --, therefor.

In Column 17, Line 25, In Claim 10, delete "at the at the" and Insert -- at the --, therefor.

In Column 18, Line 43, In Claim 18, delete "at the at the" and Insert -- at the --, therefor.

Signed and Sealed this
Fourteenth Day of March, 2023

Katherine Kelly Vidal
*Director of the United States Patent and Trademark Office*